UNITED STATES PATENT OFFICE.

JOHN E. SIEBEL, OF CHICAGO, ILLINOIS.

IMPROVEMENT IN PRESERVING WOOD.

Specification forming part of Letters Patent No. 116,638, dated July 4, 1871; reissue No. 4,550, dated September 12, 1871.

DIVISION B.

*To all whom it may concern:*

Be it known that I, JOHN E. SIEBEL, of Chicago, county of Cook and State of Illinois, have invented an Improved Process of Preserving Wood, of which the following is a specification:

The bluish-green mass which is produced in the purification of illuminating-gas, and which is considered a very obnoxious refuse by gas-makers, I term "refuse gas-lime"—a term by which this substance is generally known. This substance consists of sulphide and sulphydrate of calcium and small quantities of the lime salts of carbonic and subsulphurous acid. The two first-named ingredients—viz., the sulphide and sulphydrate of calcium—render this refuse applicable for the purpose specified herein. Extracted by water, the refuse gas-lime produces a solution which (especially when made from fresh refuse) contains large quantities of sulphide and sulphydrate of calcium. This solution I use in connection with a solution of either sulphate of zinc, or ferrous sulphate, or ferric sulphate, for the preservation and impregnation of lumber and wood in general, in the following manner: After the wood is freed from sap and its pores opened by steaming the same I impregnate the wood (by the use of force-pumps and air-pumps, in the usual manner) with a solution of either sulphate of zinc, or ferrous sulphate, or of ferric sulphate—the strength of the solution according to requirements, say one-half pound of sulphate to one gallon of water, more or less. After this impregnation has taken place another impregnation is made into the wood by the solution obtained by treating refuse gas-lime with water, say in the proportion of one pound of refuse gas-lime to one gallon of water, more or less.

If in the first impregnation ferrous or ferric sulphate were used, the second impregnation will produce within the pores of the wood insoluble deposits of sulphate of lime and black sulphide of iron; but if sulphate of zinc be used in the first injection the deposits will be sulphate of lime and sulphide of zinc, which are also both insoluble in water, but of a white color. The use of zinc sulphate in this process is, therefore, recommendable in case the wood to be preserved is not desired to be stained or colored.

If desired, the first impregnation of the wood may be made with the watery extract of the gas-lime refuse, and the second impregnation with a solution of any one of the above-mentioned sulphates.

The serious objections which exist against an older process used occasionally for preserving wood, and which consists in the successive impregnation of ferrous sulphate and burned lime in watery solution, cannot be quoted against my process. The objection referred to is the very small solubility of burned lime in water, which allows only but an insignificant portion to enter the wood, while the sulphide and sulphydrate of calcium, which are the essential agents brought to bear in my process, are very soluble in water, and can, therefore, be imparted to the wood in any desired quantity.

What I claim is—

The use of refuse gas-lime in connection with either one of the three following substances, viz., sulphate of zinc, ferrous sulphate, or ferric sulphate, for the impregnation and preservation of wood.

JOHN E. SIEBEL.

Witnesses:
A. C. LEBELL,
OTTO PELTZER.